Jan. 19, 1926.                                                                                          1,570,223
G. C. BARTRAM
PIPE JOINT
Filed Sept. 20, 1922
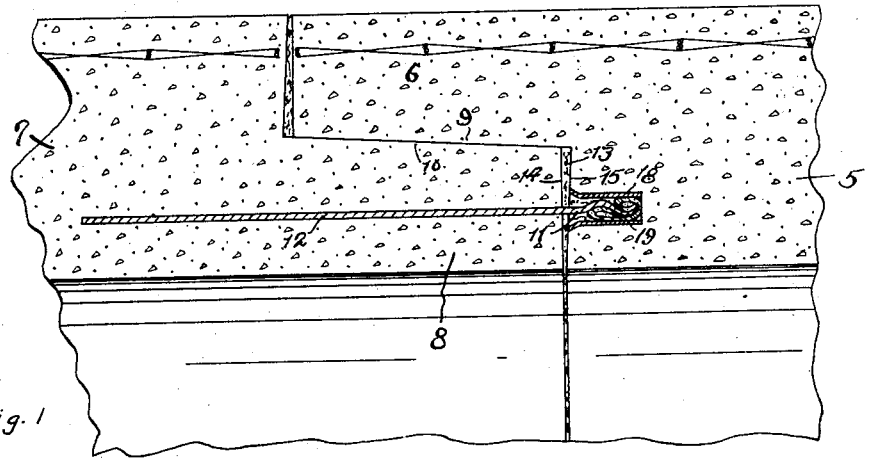
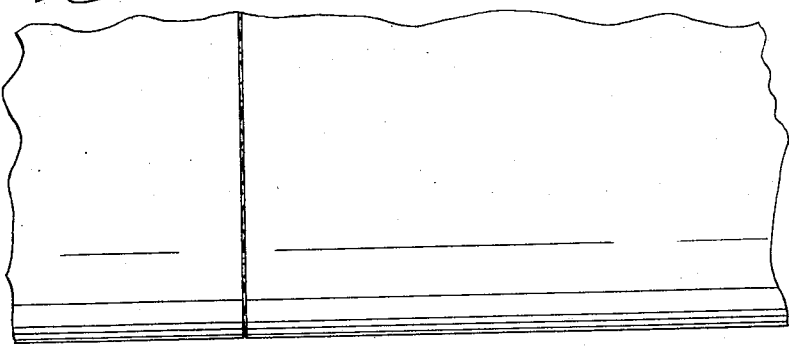
Fig. 1
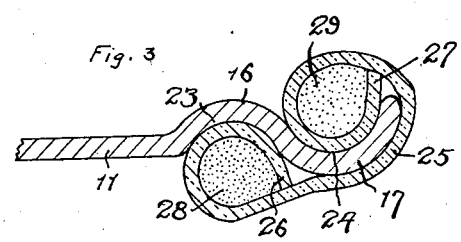
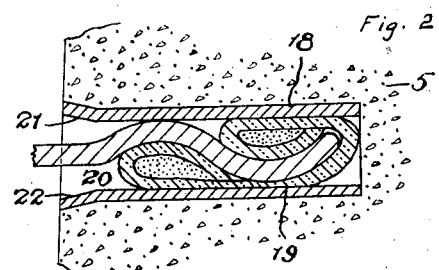
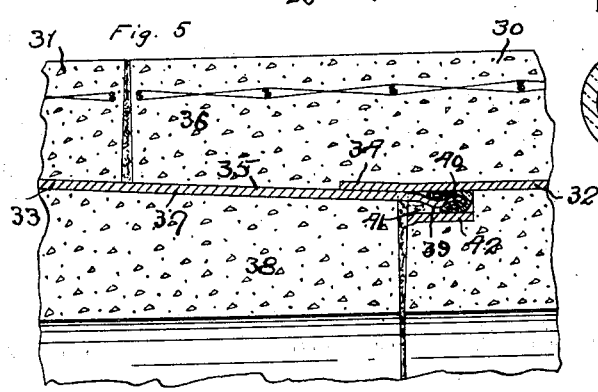
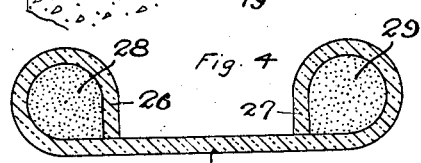
INVENTOR.
GEORGE C. BARTRAM
BY
ATTORNEYS.

Patented Jan. 19, 1926.

1,570,223

UNITED STATES PATENT OFFICE.

GEORGE CORRIE BARTRAM, OF FREEPORT, NEW YORK, ASSIGNOR TO GEORGE C. BARTRAM, INC., OF BUFFALO, NEW YORK, A CORPORATION OF NEW YORK.

PIPE JOINT.

Application filed September 20, 1922. Serial No. 589,351.

*To all whom it may concern:*

Be it known that I, GEORGE CORRIE BARTRAM, a citizen of the United States of America, residing at Freeport, in the county of Nassau, Long Island, and State of New York, have invented certain new and useful Improvements in Pipe Joints, of which the following is a specification.

My invention relates to pipe joints, and particularly to joints between sections of concrete pipes. The object of my invention is to provide the joint with sealing means which are effective for high pressure lines, and of such character that the seal is maintained regardless of expansion and contraction of the pipe sections.

In the accompanying drawings—

Fig. 1 is a broken longitudinal section through a pipe joint in which my invention is embodied in one form;

Fig. 2 is an enlarged and somewhat exaggerated transverse section through the joint seal;

Fig. 3 is a similar view of the sealing ring and gasket in condition for insertion;

Fig. 4 is an enlarged transverse section through the gasket ring alone; and

Fig. 5 is a view corresponding to Fig. 1, but showing a modification.

The invention may be embodied in various types of pipe, and at various points in the joint area. It is illustrated in the accompanying drawings in pipe sections of more or less conventional type united by a bell and spigot joint. Thus, the section 5 is undercut at its end to form a bell flange 6, while the adjacent section 7 is peripherally recessed to form a spigot flange 8 adapted to fit within and make joint with the bell flange 6 on the coned faces 9 and 10 respectively of the two flanges. While an effective joint for low pressure lines is obtained by this type of joint, and where the line is not subject to conditions which cause the joint to open, it is not effective for high pressure lines, or where the joint faces are likely to part, e. g., where the line is subject to wide temperature variations. It is the object of this invention to provide a joint which remains tight under such conditions.

For this purpose, one of the sections—for example, the spigot section 7—is provided with a sealing ring 11 having a portion 12 embedded in the pipe for anchorage, while the exposed portion thereof projects across the space 13 between the opposed faces 14 and 15 of the adjacent pipe sections in the finished joint. The exposed marginal area of the sealing ring 11 is preferably provided with two crimps 16 and 17, faced in the opposite directions.

To receive the sealing ring I embed in the cooperating bell pipe section 5 a pair of rings 18 and 19, of different diameter, arranged concentrically and thus affording an annular pocket 20 located to receive the sealing ring when the joint is made. The margins of the rings 18 and 19 adjacent the joint face may be offset respectively outwardly and inwardly at 21 and 22 to provide a flared guideway leading to the pocket 20 and serving to assist in the guidance of the sealing ring 11 into the pocket.

While the opposed crimps 16 and 17 are preferably such as to impart an effective thickness to the marginal sealing ring substantially corresponding to the space between the inner and outer walls of the pocket 20, and thus to form a seal therewith, I prefer to associate with the crimped area of the sealing ring a gasket or packing of a suitable character to seal the joint still more effectively. A suitable gasket for this purpose is afforded by lead packing. This may be of any suitable character, such for example as independent lead rings arranged in the annular channels 23 and 24 afforded by the respective crimps in the margin of the sealing ring. A still more effective packing is secured, however, if an arrangement of the type illustrated is employed. This is formed from a strip of sheet lead 25, the margins 26 and 27 of which are rolled over deformable resilient core elements 28 and 29, such as lengths of rope or cord. The width of the strip 25 is predetermined with respect to the length of the crimped area of the margin of the sealing ring 11, so that when the rolled-over edge 26 of the packing strip is located in the channel 23 of the sealing ring, the other margin 27 of the packing may be bent over the edge of the sealing ring and pressed into the channel 24 thereof as illustrated in Figs. 1 and 2. It is apparent that if the packing be arranged in this manner upon the sealing ring before the joint is made, it is self-supporting in position and is carried by the sealing ring into the pocket 20 as the pipe sections are shoved together to make the joint.

The diameter of the resilient core elements 28 and 29 for the rolled-over margins of the packing ring is preferably such that the over-all thickness of the packing, when arranged on the crimped margin of the sealing ring, is greater than the spacing between the concentric rings 17 and 18 which form the receiving pocket. Consequently, when the pipe sections are shoved together to make the joint, the marginal areas of the packing ring are distorted and compressed against the faces of the rings 18 and 19 and form an effective seal therewith. Moreover, the crimps 16 and 17 are themselves distorted as the sealing ring enters the pocket 20 and thus force the packing against the walls of the pocket 20. This insures a very tight joint, which is effectually sealed even against high pressure leaks.

It will be obvious that the seal is effective regardless of such longitudinal separation of the pipe sections as may be incident to shrinkage or contraction under varying temperature conditions. The depth of the pocket afforded by the rings 18 and 19 is such that longitudinal play of the crimped area of the sealing ring therein may occur without affecting the seal.

In Fig. 5 I have applied the same thought to pipe sections 30 and 31, each of which has embedded therein a cylindrical metal shell 32, 33. As indicated, the end of the shell 32 is slightly flared at 34, and is continued by the conical face 35 of the bell flange 36 of the pipe. Similarly, the shell 33 of pipe section 31 is conically constricted at 37 and forms a facing for the spigot flange 38. Thus, when the pipe sections are shoved together to form a joint, the latter is effected between the metal faces 34 and 37.

The margin of the conical extension 37 of the metal cylinder 33 is extended beyond the end of the spigot flange 38 and is crimped at 39 and 40 to form a sealing ring corresponding to that above described and shown in Figs. 1–3. To cooperate therewith, a pocket 41 is formed in the face of the pipe 30 between the cylindrical portion of the shell 32 and a concentric ring 42 of less diameter, cast into the pipe.

As stated above, a joint of this character may be made in any style of pipe joint, such for instance as a butt joint. I prefer, however, a bell and spigot of the type illustrated, since not only is the seal more fully protected from external influences, but it is to a certain extent relieved of strain by the tightness of the joint between the bell and spigot flanges. This is particularly the case where the pipe is cast on machined forms which impart to the joint surfaces of the concrete a finish which is substantially as effective as metal facing, if proper care be utilized in the preparation of the composition of the concrete at the joint faces. It will of course be understood also that the joint faces, and in fact the entire meeting faces, of the pipe ends, including the sealing pocket, are all smeared or heavily coated with some plastic sealing material, such as pitch, asphalt or other appropriate sealing material, which is plastic under the range of temperature variations which the particular joint is likely to encounter.

Various modifications in construction and arrangement will readily occur to those dealing with the problem, which do not depart from what I claim as my invention.

I claim—

1. A joint between concrete pipe sections, comprising a sealing ring embedded in one of said sections and having a crimped margin projecting beyond an end face thereof, an annular pocket formed in the opposed end of the other pipe section and adapted to receive the projecting margin of said sealing ring, in combination with packing means comprising tubular gasket elements seated in the annular channels of the projecting margin of the sealing ring, and of such dimensions that upon the entry of the said margin of the ring into the pocket, the gasket is deformed into packing relation with a wall of the pocket.

2. A joint between concrete pipe sections, comprising a sealing ring embedded in one of said sections and projecting beyond an end face thereof, an annular pocket formed in the opposed end of the other pipe section and adapted to receive said sealing ring, in combination with a packing element comprising an annulus adapted to embrace the sealing ring between its opposite side margins, said margins having enlargements adapted for deformation upon the insertion of the sealing ring into the pocket to effect a seal.

3. A joint between concrete pipe sections, comprising a sealing ring embedded in one of said sections and projecting beyond an end face thereof, an annular pocket formed in the opposed end of the other pipe section and adapted to receive the projecting portion of said sealing ring, in combination with a packing element comprising an annulus adapted to embrace the sealing ring between its opposite side margins, said margins having enlargements adapted for deformation upon the insertion of the sealing ring into the pocket to effect a seal, said enlargements at the opposite side margins of the packing annulus being longitudinally spaced against opposite faces of the sealing ring.

4. A joint between concrete pipe sections, comprising a sealing ring embedded in one of said sections and projecting beyond an end face thereof, an annular pocket formed in the opposed end of the other pipe section and adapted to receive the projecting portion of said sealing ring, in combination with a lead packing gasket carried by the projecting portion of the sealing ring, and of such dimensions that upon the entry of the said portion of the ring into the pocket, the gasket is deformed into packing relation with a wall of the pocket, together with a compressible filler encased in the gasket.

5. A joint between concrete pipe sections, comprising a sealing ring embedded in one of said sections and projecting beyond an end face thereof, an annular pocket formed in the opposed end of the other pipe section and adapted to receive the projecting portion of said sealing ring, in combination with a lead packing gasket embracing the entering margin of the sealing ring and of such dimensions that upon the insertion of the ring into the pocket the gasket is deformed into packing relation with the inner and outer walls of the pocket, together with a compressible filler encased in the opposite margins of the gasket.

6. A joint between concrete pipe sections, comprising a sealing ring embedded in one of said sections and projecting beyond an end face thereof, an annular pocket formed in the opposed end of the other pipe section and adapted to receive the projecting portion of said sealing ring, in combination with a lead packing gasket carried by the projecting portion of the sealing ring, and of such dimensions that upon the entry of the said portion of the ring into the pocket, the gasket is deformed into packing relation with a wall of the pocket, the projecting portion of the sealing ring being crimped.

7. A joint between concrete pipe sections, comprising a sealing ring embedded in one of said sections and projecting beyond an end face thereof, an annular pocket formed in the opposed end of the other pipe section and adapted to receive said sealing ring, in combination with lead packing arranged on opposite faces of said ring, and of such dimensions that upon the insertion of the ring into the pocket said packing is deformed by its engagement with the inner and outer walls of the pocket, the projecting portion of the sealing ring being crimped.

8. A joint between concrete pipe sections, comprising a sealing ring embedded in one of said sections and having a crimped margin projecting beyond an end face of said section, an annular pocket formed in the section and opposite end of the other pipe section and adapted to receive the crimped margin of the sealing ring, in combination with a lead gasket having rolled-over edges and embracing said crimped margin of the sealing ring and engaging the inner and outer faces of the annular pocket in the completed joint.

9. A joint between concrete pipe sections, comprising a sealing ring embedded in one of said sections and projecting beyond an end face thereof, said projecting portion of the sealing ring being crimped, an annular pocket formed in the opposed end of the other pipe section and adapted to receive the projecting crimped portion of said sealing ring, in combination with packing means comprising a tubular deformable gasket element lying in the crimp of said sealing ring and of such dimensions that upon the entry of said sealing ring into the pocket the gasket element is deformed into packing relation with the wall of the pocket.

10. A joint between concrete pipe sections, comprising a sealing ring embedded in one of said sections and projecting beyond an end face thereof, said projecting portion of the sealing ring being crimped to afford oppositely faced channels, an annular pocket formed in the opposed end of the other pipe section and adapted to receive the projecting crimped portion of said sealing ring, in combination with packing means comprising tubular deformable gasket elements engaged with opposite faces of said sealing ring and lying in the channels afforded by the crimping thereof, said packing means being of such dimensions that upon the entry of the sealing ring into the pocket the said tubular gaskets are deformed into packing relation with the walls of the pocket.

In testimony whereof I have signed my name to this specification.

GEORGE CORRIE BARTRAM.